US007611565B1

(12) United States Patent
Paglieri et al.

(10) Patent No.: US 7,611,565 B1
(45) Date of Patent: Nov. 3, 2009

(54) DEVICE FOR HYDROGEN SEPARATION AND METHOD

(75) Inventors: Stephen N. Paglieri, White Rock, NM (US); Iver E. Anderson, Ames, IA (US); Robert L. Terpstra, Ames, IA (US)

(73) Assignee: Los Alamos National Security, LLC, Los Alamos, NM (US)

( * ) Notice: Subject to any disclaimer, the term of this patent is extended or adjusted under 35 U.S.C. 154(b) by 392 days.

(21) Appl. No.: 11/581,981

(22) Filed: Oct. 16, 2006

Related U.S. Application Data (60) Provisional application No. 60/728,470, filed on Oct. 20, 2005.

(51) Int. Cl.
B01D 53/22 (2006.01)
(52) U.S. Cl. .................. 95/56; 96/11; 427/245
(58) Field of Classification Search .......... 95/55, 95/56; 96/4, 11; 55/DIG. 5; 428/469, 548; 427/404, 245, 250, 405, 203
See application file for complete search history.

(56) References Cited

U.S. PATENT DOCUMENTS

| | | | | |
|---|---|---|---|---|
| 2,958,391 | A | * | 11/1960 | Derosset .................. 95/56 |
| 5,125,574 | A | | 6/1992 | Anderson et al. |
| 5,228,620 | A | | 7/1993 | Anderson et al. |
| 5,393,325 | A | * | 2/1995 | Edlund .................. 95/56 |
| 5,498,278 | A | * | 3/1996 | Edlund .................. 96/11 |
| 5,738,708 | A | * | 4/1998 | Peachey et al. ........... 95/56 |
| 6,142,382 | A | | 11/2000 | Ting et al. |
| 6,152,987 | A | * | 11/2000 | Ma et al. ............... 95/56 |
| 6,183,542 | B1 | * | 2/2001 | Bossard ................ 96/11 |
| 6,340,379 | B1 | * | 1/2002 | Penth et al. ............ 95/45 |
| 6,533,563 | B1 | | 3/2003 | Otaigbe et al. |
| 6,964,697 | B2 | * | 11/2005 | Pan et al. .............. 96/10 |
| 7,125,440 | B2 | * | 10/2006 | Bossard et al. .......... 96/10 |
| 7,172,644 | B2 | * | 2/2007 | Ma et al. .............. 95/56 |
| 2002/0020298 | A1 | * | 2/2002 | Drost et al. ............ 96/11 |
| 2003/0183080 | A1 | * | 10/2003 | Mundschau ............ 95/55 |
| 2003/0190486 | A1 | | 10/2003 | Roa et al. |
| 2003/0213365 | A1 | * | 11/2003 | Jantsch et al. .......... 96/11 |
| 2004/0037962 | A1 | * | 2/2004 | Uemura et al. ......... 427/378 |
| 2004/0237779 | A1 | * | 12/2004 | Ma et al. .............. 95/55 |
| 2004/0244590 | A1 | * | 12/2004 | Ma et al. .............. 96/11 |
| 2005/0061145 | A1 | * | 3/2005 | Alvin et al. ........... 95/56 |

OTHER PUBLICATIONS

Su et al., "Thin Palladium Film Supported on $SiO_2$-Modified Porous Stainless Steel for a High-Hydrogen Flux Membrane," Ind. Eng. Chem. Res., Apr. 2005, vol. 44, No. 9, pp. 3053-3058.

(Continued)

*Primary Examiner*—Frank M Lawrence
(74) *Attorney, Agent, or Firm*—Mark N. Fitzgerald; Samuel L. Borkowsky (57) ABSTRACT

A device for hydrogen separation has a porous support and hydrogen separation material on the support. The support is prepared by heat treatment of metal microparticles, preferably of iron-based or nickel-based alloys that also include aluminum and/or yttrium. The hydrogen separation material is then deposited on the support. Preferred hydrogen separation materials include metals such as palladium, alloys, platinum, refractory metals, and alloys.

18 Claims, 4 Drawing Sheets

OTHER PUBLICATIONS

Tong et al., "Thin Pd Membrane Prepared on Macroporous Stainless Steel Tube Filter by an In-Situ Multi-Dimensional Plating Mechanism," Chemical Communications, Oct. 2004, vol. 21, pp. 2460-2461.

Rothenberger et al., "High Pressure Hydrogen Permeance of Porous Stainless Steel Coated With a Thin Palladium Film Via Electroless Plating," J. Membrane Science, Nov. 2004, vol. 244, pp. 55-68.

Lee et al., "Study on the Variation of Morphology and Separation Behavior of the Stainless Steel Supported Membranes at High Temperature," J. Membrane Science, Aug. 2003, vol. 220, pp. 137-153.

Roa et al., "Preparation and Characterization of Pd-Cu Composite Membranes for Hydrogen Separation," Chem. Eng. J., May 2003, vol. 93, No. 1, pp. 11-22.

Terpstra et al., "Porous Metallic Hot Gas Filters," Advances in Powder Metallurgy and Particulate Materials-2003, compiled by R. Lawcock et al., Metal Powder Industries Federation, Princeton, NJ, Nov. 2003, part 9, pp. 73-85.

Terpstra et al., "Alloy Development for Hot Gas Filters," Advances in Powder Metallurgy and Particulate Materials-2002, compiled by V. Arnhold et al., Metal Powder Industries Federation, Princeton, NJ, Nov. 2002, part 1, pp. 92-102.

Shu et al., "Structurally Stable Composite Pd-Ag Allow Membranes: Introduction of a Diffusion Barrier," Thin Solid Films, Sep. 1996, vol. 286, No. 1-2, pp. 72-79,.

* cited by examiner

DEVICE FOR HYDROGEN SEPARATION AND METHOD

RELATED CASES

This application claims the benefit of U.S. Provisional Patent Application Ser. No. 60/728,470, filed Oct. 20, 2005, hereby incorporated by reference.

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to support structures for hydrogen permeable membranes, and, more particularly, to the use of metal microparticles as a support structure for hydrogen permeable membranes.

BACKGROUND OF THE INVENTION

Ultra-pure hydrogen can be produced conveniently using metal membranes. Palladium alloy membranes are frequently used to purify hydrogen for compound semiconductor manufacturing, and in laboratories. It is also advantageous to use membrane reactors to perform chemical reactions more efficiently. Unfortunately, the high cost of palladium prevents metal membrane technology from replacing large-scale hydrogen purification methods such as pressure swing adsorption. Filters for hot gas cleanup have been fabricated using iron aluminide particles that resist oxidation and degradation by gaseous impurities commonly present in coal gas. Pouring the molten alloy through a nozzle and atomizing the stream with high-velocity gas such as helium produces spherical microparticles with a narrow size distribution. Alloys with extra aluminum such as Fe-16Al-2Cr (weight percent) can form a thermally grown aluminum oxide layer on the surface that protects the metal from further degradation. An advantage of thermally grown layers compared to extrinsic coatings is more uniform surface coverage with fewer defects. For example, chrome-containing alloys have been shown to form a continuous nitride layer at 1373 K that resists leaching in the acidic environment of a proton exchange membrane fuel cell (PEMFC).

Porous metal as a palladium membrane support has advantages of similar coefficient of thermal expansion to palladium, increased strength compared to porous ceramic or glass, and the potential to more easily seal into a module. Porous metal tubes and sheet are commercially available in pore sizes as small as 0.1 µm particle retention. However, the as-received surface roughness and pore size is too great to successfully deposit a thin (<10 µm), pinhole-free palladium or palladium alloy film. The deposition of a palladium film without defects depends on the ability to span all of the pores in the support membrane. Therefore, the critical qualities of a palladium membrane support are low surface roughness and small pore size. Metallic atoms from stainless steel such as chromium are also known to diffuse through into palladium and cause a decrease in membrane permeability. Metallic inter-diffusion that occurs between palladium and porous stainless steel at temperatures $\geq 450°$ C. has been reduced by thin layers of oxide, nitride, or refractory metal; membrane stability then depends on the stability of the intermediate layer.

Metals with bcc structure such as vanadium, niobium, tantalum, and titanium have higher hydrogen permeabilities than palladium but suffer from surface contamination and hydrogen embrittlement. However, alloys of these metals may possess some of the properties desired in a metal membrane including high hydrogen permeability, low cost, and ductility under hydrogen over a large temperature range. Generally, these metals require a thin film of palladium on their surfaces to catalyze the dissociation of molecular hydrogen and enable absorption into the metal (and recombination on the downstream side). The palladium film thickness required is generally much less than a freestanding or supported foil membrane. Palladium-coated vanadium, niobium, and tantalum membranes have been studied. These membranes embrittle due to the formation of hydride phases, especially at lower temperatures. Vanadium alloys that have been investigated for hydrogen membranes include V—Ni, V—Al, V—Ni—Al, and V—Cr—Ti. Promising ternary alloys based on the V—Ti—Ni or Ta—Ti—Ni systems exhibit hydrogen permeabilities comparable to palladium and they resist embrittlement. Besides embrittlement, another problem experienced by metal composite membranes is metallic inter-diffusion between the substrate foil and the palladium overcoat. For example, palladium-coated tantalum membranes have experienced a slow decline in hydrogen flux at temperatures $\geq 400°$ C.

Ceramic membranes are fabricated from metal oxide particles that are suspended in a solution or slurry, extruded, dried, and fired. Layers of finer particles may be applied using sol-gel dip coating or slip casting followed by firing. Smooth surfaces and very small pore sizes (<1 nm) can be obtained. However, ceramics are brittle, multiple coating and firing steps are labor intensive (expensive), and the coefficient of thermal expansion (CTE) can vary substantially from commonly used hydrogen separating membrane materials such as palladium. Metal oxides commonly used in membrane fabrication include alumina, titania, and zirconia. Porous ceramic layers can also be applied to porous metal supports using these methods, although the difference in CTE may cause such layers to crack and delaminate at elevated temperatures.

Other porous structures used to support thin films of hydrogen separating membrane materials include silica glass (VYCOR), perforated silicon, and anodic alumina. These membranes are formed by selectively etching away material to form pores. These materials are fragile, and a further disadvantage of silica is that it is attacked by steam.

The best commercially available metal membrane support materials have larger pores and rougher surfaces than the porous metal membrane material described in this invention. The ability to deposit a continuous, defect-free coating of hydrogen separating membrane material onto a porous support is directly related to the pore size and roughness of the support. Smaller pores and a smoother membrane support surface have been correlated with the ability to obtain essentially continuous hydrogen separating membrane films on the order of a few microns thick or less.

Since materials utilized for separating hydrogen rely primarily on costly palladium and palladium alloys, and considering that hydrogen flux is generally inversely proportional to membrane thickness, minimizing the thickness of the separating layer is highly desirable.

SUMMARY OF THE INVENTION

In accordance with the purposes of the present invention, as embodied and broadly described herein, the present invention includes a device for separating hydrogen from other materials. The device includes a porous substrate of metal microparticles, the porous substrate having an outer atomic diffusion barrier layer that is substantially incapable of hydrogen reduction. The device also includes hydrogen separation material on the diffusion barrier layer of the support structure.

The invention also includes a method for making a device for separating hydrogen from a gaseous mixture. The method involves forming a support structure from microparticles of a material selected from the group consisting of iron alloys and nickel alloys. The support structure has an outer diffusion barrier layer that is substantially incapable of hydrogen reduction. After forming the support structure, hydrogen separation material is deposited on the diffusion barrier layer of the support structure.

The invention also includes a method for separating hydrogen. The method involves forming a support structure from microparticles of a material selected from the group consisting of iron alloys and nickel alloys, the support structure comprising a diffusion barrier layer that is substantially incapable of hydrogen reduction; then depositing hydrogen separating material on the diffusion barrier layer, thereby forming a device for separating hydrogen; and then using the device to separate hydrogen.

BRIEF DESCRIPTION OF THE DRAWINGS

FIG. 2 shows (a) an optical micrograph of the top surface of a cracked membrane support, and (b) a scanning electron micrograph (SEM) of the top surface of the support.

FIG. 4 shows (a) an optical micrograph of the top surface of an uncracked membrane support of the invention, and (b) an SEM micrograph of an edge region of the support.

DETAILED DESCRIPTION

The present invention is concerned with hydrogen separation, with a porous membrane support, and with a device for hydrogen separation prepared by depositing a hydrogen separation material on the support.

A microporous membrane is hereafter defined as a membrane with a pore size <2 nanometers (nm). A mesoporous membrane is hereafter defined as a membrane with a pore size of between 2 nm and 50 nm. A macroporous membrane is hereafter defined as a membrane with pore size >50 nm.

A hydrogen permeable membrane is hereafter defined as a porous or nonporous material through which hydrogen selectively permeates and other gases are excluded or permeate much less easily than hydrogen does.

Separation mechanisms of porous membranes include molecular sieving or surface diffusion. Hydrogen permeates through non-porous membrane materials via a solution-diffusion interstitial mechanism. Metal membranes usually have much higher permselectivity for hydrogen because other gases have negligible solubility in metals (such as palladium).

Permselectivity is the ratio of permeation flux of hydrogen and permeation flux of another gas through the membrane.

Some preferred embodiments of the present invention include porous membrane supports of spherical metal microparticles, where the metal microparticles are of iron-based or nickel-based metal alloys.

In other preferred embodiments, these iron-based or nickel-based alloys also include elements such as aluminum or yttrium that form a stable, thermally and chemically resistant oxide on surfaces of the particles that form the support structure, including at the interface between the support structure and the hydrogen separation material.

Preferred spherical particles of metal alloy powder used to create a porous membrane support have an average particle size of about 3 microns or less. Porous supports of the invention made from these particles have a smoother surface with smaller pores than what is typically observed in commercially available porous metal membrane supports. The porous substrate may include pore sizes in a range of from about 0.05 micrometers to about 0.5 micrometers. The porous substrate may include pore sizes in a range of from about 0.1 micrometers to about 0.3 micrometers. In an embodiment, forming a support structure of this invention is performed by sintering the microparticles together so that a support structure having pore sizes in a range of from about 0.05 micrometers to about 0.15 micrometers is formed.

In an embodiment, spherical metal microparticles of iron-based or nickel-based alloys are applied to a surface of a macroporous membrane in order to favorably modify these supports by reducing the pore size and surface roughness. To create a smoother surface, the metal microparticles may also be applied to the surface and fill the pores of a porous membrane using vacuum, pressure, carrier fluid, or ultrasound assisted infiltration. Following application, the metal microparticles are sinter-bonded by a high temperature exposure (in vacuum or inert atmosphere) that allows solid state diffusion to join adjacent particles, but does not permit excessive closure of the open pore structure. These characteristics of the porous membrane support allow a thinner, defect-free metal membrane to be deposited on the surface of the porous metal support or within the pores of the support, or placed on the surface of the porous metal membrane support.

Preferred hydrogen separating membrane materials include, but are not limited to, palladium, alloys of palladium, other platinum group metals such as platinum, ruthenium, iridium, rhenium, or rhodium, and can also include refractory metals known to be highly permeable to hydrogen such as vanadium, niobium, tantalum, zirconium, titanium, and their alloys coated with palladium and/or palladium alloys.

Methods for deposition of the hydrogen separating membrane material can include, but are not limited to, electroless plating, electroplating, chemical vapor deposition, (CVD), physical vapor deposition (PVD, such as electron beam evaporation or sputtering), ion-exchange, impregnation and reduction, or other deposition processes mentioned in the literature. Thin foils fabricated by the above methods, or any other method such as rolling (or deposition onto, and removal from a smooth substrate), may also be placed on the surface of the porous membrane support material.

The invention allows the use of a composite membrane structure (thin hydrogen separating membrane film or layer of particles supported by a porous membrane support) for separating hydrogen at temperatures generally higher than those of the prior art due to the formation of a barrier to metallic inter-diffusion between the hydrogen separating membrane layer and the underlying porous metal membrane support prior to application of the hydrogen separating membrane layer. A pressed or sintered porous membrane support consisting of an iron alloy containing elements such as aluminum or yttrium can be heated in moderate vacuum or in inert gas containing an amount of oxygen, so that a thin, continuous layer of aluminum or yttrium oxide (alumina or yttria) is formed over all surfaces of the particles of the porous metal membrane. Metallic inter-diffusion between the hydrogen separating metal membrane material and the underlying porous metal support is subsequently inhibited, or at least minimized, due to the stable physical and chemical nature of the oxide layer.

In another embodiment, nitride or oxynitride layers may be used in place of oxygen to form stable and effective barriers to metallic inter-diffusion Thermal diffusion barriers based on compounds formed from the constituents of stainless steel alloys such as iron and chrome oxides or nitrides are prone to reduction by hydrogen during operation at elevated temperatures in a reducing environment. Without a barrier to inhibit metallic inter-diffusion between the porous metal membrane support material and the hydrogen separating membrane material, components of steel (particularly iron and chrome) are known to diffuse into and contaminate the active membrane. These constituents poison the membrane by irreversibly reducing the hydrogen permeability and may contribute to the formation of pinholes or defects in the membrane structure (in the case of a thin film), resulting in a loss of permselectivity towards hydrogen.

In the past, attempts to overcome the problem of metallic inter-diffusion include the pre-oxidation of metallic supports, treatment of the metal to produce nitride, placement of a porous mesh or cloth composed of a stable hydrogen permeable material between the porous support and the hydrogen separating metal layer, and coating the porous metal with oxide layers such as alumina or silica via sol-gel dip coating, slip casting, or other deposition methods. In contrast, according to embodiments of the present invention, after a stable alumina or yttria layer forms during heat treatment, the deposition of additional coatings or layers or the application of supplementary treatments is unnecessary prior to application of the hydrogen separating metal layer onto or within the porous metal support. Furthermore, because aluminum or yttrium (in some embodiments) is originally uniformly distributed within the particles, a continuous alumina layer forms both on the surface and within the pores of the membrane during the heat treatment. Since the layer is very thin, it is also more durable in addition to being resistant to degradation by chemicals such as hydrogen sulfide.

When aluminum or yttrium are used, a preferred heat treatment takes place under an atmosphere with very low oxygen content at temperatures in a range of from about 800 degrees Celsius to about 1000 degrees Celsius for a period of time sufficient to result in the formation of a film of metal oxide, where some of the aluminum and/or yttrium is consumed in favor of forming the corresponding aluminum oxide or yttrium oxide. A preferred amount of time for this oxide layer to form is about 24 hours. This layer of aluminum oxide, yttrium oxide, or oxide combination is largely immune to hydrogen reduction. The entire substrate is coated with this oxide material. A preferred coating thickness in a range of from about 50 angstrom to about 250 angstrom. A preferred thickness is about 100 angstrom. A preferred amount of aluminum is in the range of from about 4 percent by mass to about 20 percent by mass. A preferred amount of aluminum is about 16 percent by mass. A preferred amount of yttrium is in a range of from about 0.1 percent by mass to about 1.5 percent by mass.

In demonstrating the invention, iron-aluminide microparticles were prepared by a high-velocity gas jet atomization method described by Anderson et al., in "Progress Toward Gas Atomization Processing With Increased Uniformity and Control," Materials Science and Engineering A, vol. 326 (2002), pp. 101-109. The Fe-16Al-2Cr particles had a size distribution (after size classification) centered at around 3 micrometers ($\mu$m). A slurry of these particles was prepared and applied to a porous INCONEL frit (nominal 0.1 $\mu$m particle retention). Porous INCONEL (MOTT METALLURGICAL) frits were press fit into the ends of 0.95 cm ID tubes that had been drilled out to form a lip inside. A 1 mm gap was left between the porous frit and the end of the tube for the microparticle slurry. The top of the particle film was smoothed off evenly with a razor blade and the membrane was fired in a vacuum furnace.

Single gas hydrogen and argon permeation tests were performed using a flow-through system. Retentate pressure was controlled using a backpressure regulator and permeate flow rate was measured using a calibrated flow meter. Overall system control and data logging was carried out using National Instruments Labview software and Fieldpoint modules.

Before deposition of the palladium film, the INCONEL tube was milled down on a lathe using a carbide-tipped tool so that it was flush with the surface of the porous microparticle membrane (which had contracted slightly during firing). A 2-$\mu$m-thick palladium film was deposited onto the membrane by EB-PVD in a vacuum chamber at <$10^{-6}$ Pa. AES was performed in a KRATOS Axis-Ultra surface analysis system. A 5 kV argon ion gun was used to sputter a 2×2 mm crater. AES was performed with an electron gun at a primary beam energy of 5 kV. Relative species concentrations were determined using the peak-to-peak height of the differentiated signal for each component, and applying published Auger sensitivity factors.

Permeation measurements were conducted on the porous INCONEL (0.1 $\mu$m pore size) coated with a layer of the 3-$\mu$m particles. The ideal gas permselectivities ($\alpha_{H2/Ar}$=$H_2$-flowrate/Ar-flowrate) calculated from the measurements were around 3.0 to 3.3. For Knudsen flow, where the interaction of gaseous atoms or molecules with the pore wall becomes more prevalent because of the small pore size, the separation factor is determined by the inverse ratio of square root of molecular weights of the gases:

$$\alpha_{Knudsen} = \sqrt{\frac{MW_{Ar}}{MW_{H_2}}} = 4.45$$

The ideal gas permselectivities ($\alpha_{H2/Ar}$) calculated from the measurements were between 3.0 and 3.3. Therefore, the gas permeation mechanism through the porous membrane had contributions from both Knudsen and viscous flow.

After sintering, the surface of the Fe-16Al-2Cr membrane was analyzed using Auger electron spectroscopy (AES). AES was used to probe small areas of the surface. Aluminum, oxygen, some iron, and traces of carbon, sulfur, and boron were detected. The boron and sulfur appeared to be localized on the surface of blisters. The surface was also analyzed by X-ray photoelectron spectroscopy (XPS) to confirm the chemical state of the iron and aluminum. The location and structure of the photoelectron peaks for both elements show a mixture of oxidized and non-oxidized components, although the iron chemical state observed from the smooth areas is mostly elemental with only a very small oxide component. Carbon is a commonly seen contaminant, and some of the carbon present is undoubtedly a result of air exposure. The sulfur and boron may be artifacts of the particle manufacturing process.

The membrane support was coated with 2 $\mu$m of palladium using electron beam physical vapor deposition (EB-PVD). The palladium-coated membrane was annealed at 500° C. for 100 h under vacuum to test membrane durability. Some of the palladium exfoliated off of the porous Fe-16Al-2Cr membrane.

The membrane was analyzed using X-ray photoelectron spectroscopy (XPS). Interestingly, the surface was almost entirely iron oxide and no aluminum oxide was detected. It is unclear why palladium exfoliated, and also why aluminum was not detected on the surface of the porous Fe-16Al-2Cr after palladium deposition and heat treatment.

The porous membrane supports fabricated from Fe-16Al-2Cr particles of 3-μm average diameter were characterized. At temperatures up to 600° C., the membrane had high hydrogen and argon permeability, but the gas permselectivities were indicative of Knudsen diffusion. The membrane supports were covered with a thin layer of alumina that could serve as an effective barrier to metallic inter-diffusion for the thin palladium film deposited onto the surface. However, a 2-μm-thick palladium film deposited on the surface did not fully adhere after treating at 500° C. for 100 h under vacuum. Some iron had diffused to the surface of the intact portion of the palladium film, suggesting that the alumina layer that had existed before the heat treatment was not sufficiently thick to completely prevent metallic inter-diffusion.

The following EXAMPLES demonstrate the operability of the invention.

Example 1

Figure 1:
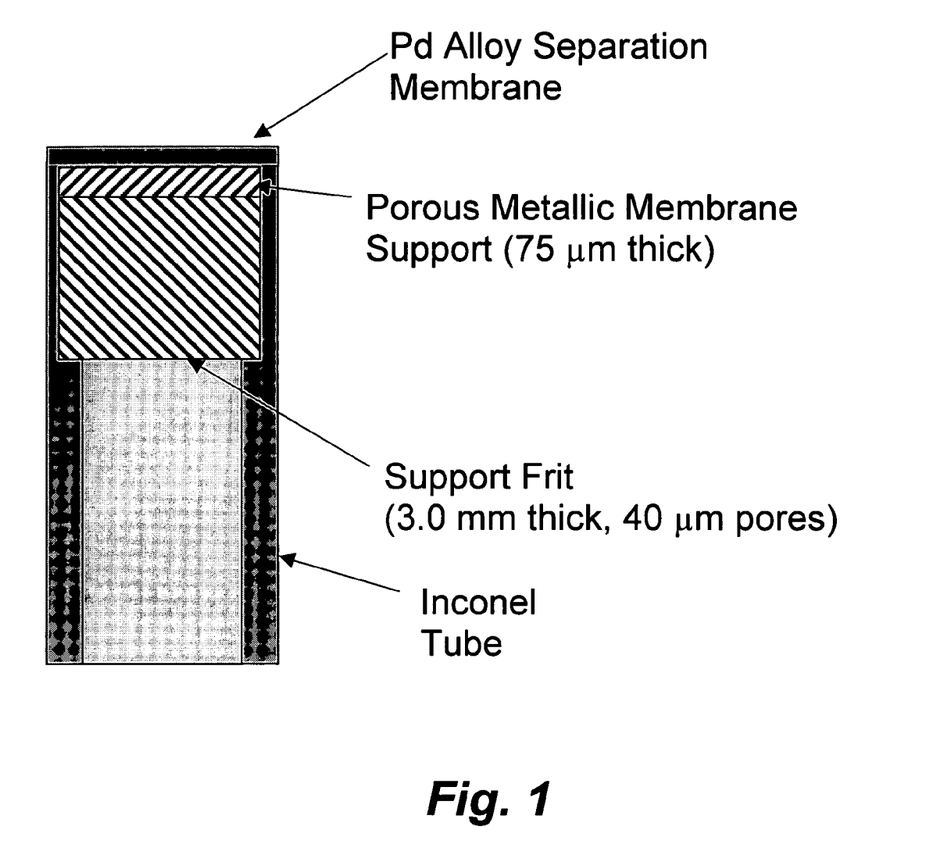
FIG. 1 shows a schematic representation of initial configuration of the separation membrane assembly.
Figure 2A:
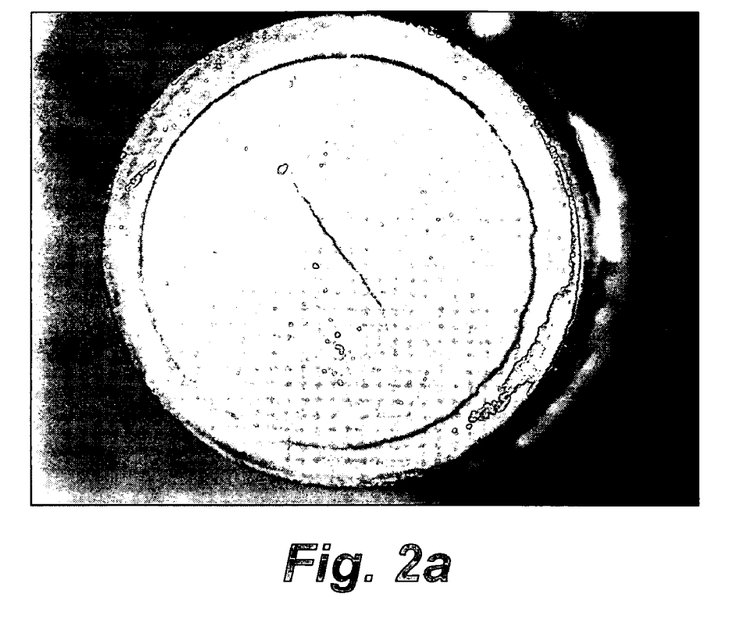
Figure 2B:
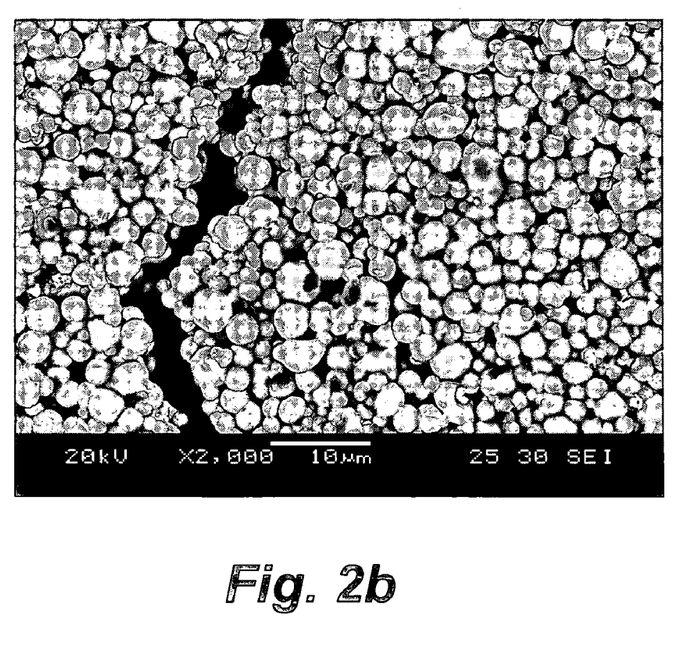

Preparation of substrate support. Spherical gas atomized powder of Fe-16Al-2Cr (weight percent) was size fractioned by pneumatic (air) classifier to produce a sample having particle sizes less than about 3 micrometers (μm). The powder sample was suspended in isopropyl alcohol (IPA) to make a slurry, and the slurry was poured into a 3-millimeter-thick stainless steel (SAE 316L) filter frit with a course pore size (40 μm, on average) that was fixed within an INCONEL support tube, as shown in FIG. 1, Because of the gap that was fixed by the recess distance of the support frit, the resulting thickness of the drained slurry was about 75 μm, after striking-off the surface with a razor blade. This assembly was heated in a vacuum furnace at 600° C./hour from room temperature to 975° C. and sintered at a dynamic vacuum of $10^{-6}$ torr for 4 hours, followed by cooling at 600° C./hour to room temperature. The resulting porous body exhibited a cracked region immediately adjacent to the interior circumference of the INCONEL support tube and a center crack (see FIG. 2). This crack was attributed to excess densification shrinkage due to the sintering process that produced a radial tensile stress state on the porous support body, resulting in the observed cracking.

Example 2

Figure 3:
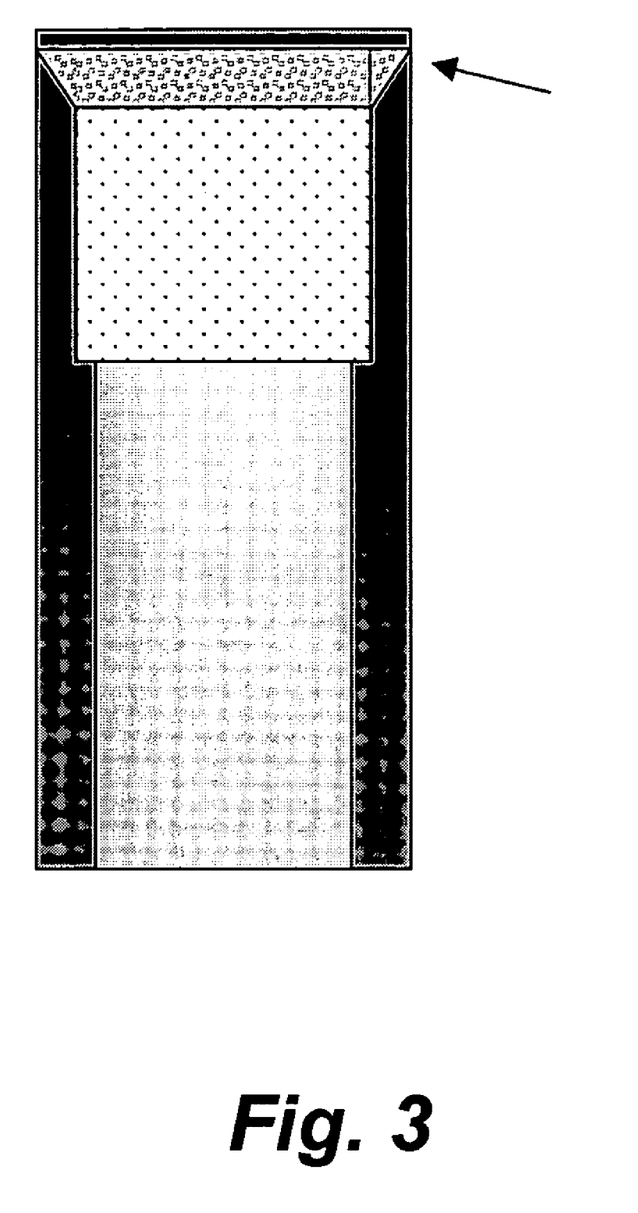
FIG. 3 shows a schematic representation of a membrane assembly with chamfered cavity (see arrow) that contains the porous metallic membrane support.
Figure 4A:
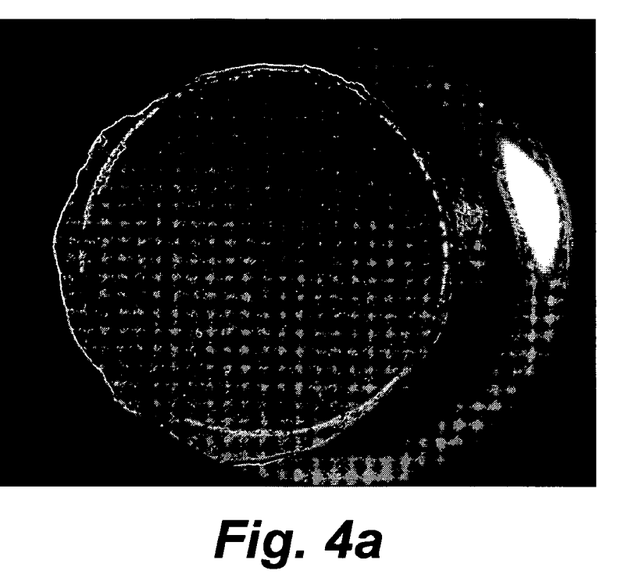
Figure 4B:
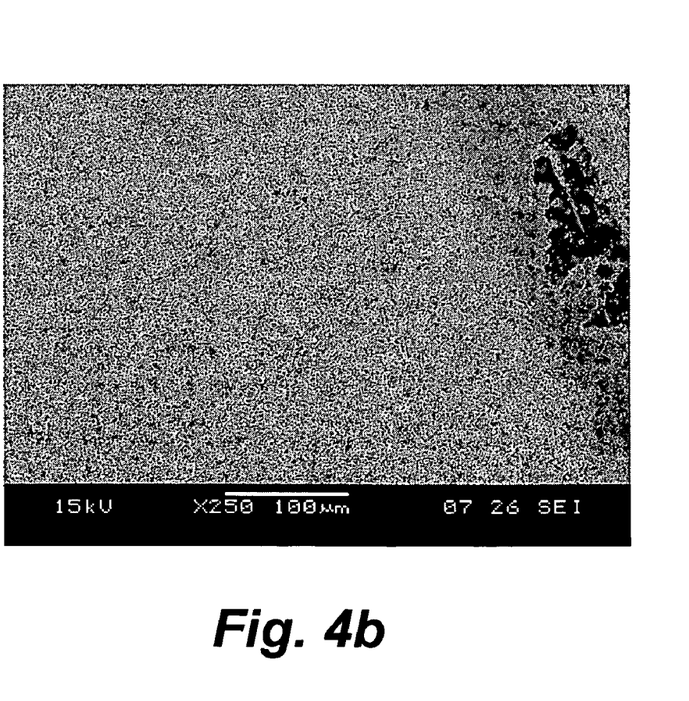

Preparation of substrate support. Spherical gas atomized powder of Fe-16Al-2Cr (weight percent) was size fractioned by pneumatic (air) classifier to produce a sample having particle sizes less than about 3 μm. The powder sample was suspended in isopropyl alcohol (IPA) to make a slurry, and the slurry was poured into a thick (3 mm) stainless steel (SAE 316L) filter frit with a course pore size (40 μm, on average) that was fixed within an INCONEL support tube, similar to that shown in FIG. 1. A change in this support tube was the addition of a chamfer of 3 degrees (shown schematically in FIG. 3) from the horizontal to slope toward the interior. Because of the gap that was fixed by the recess distance of the support frit, the resulting overall thickness of the drained slurry again was about 75 μm, after striking-off the surface with a razor blade. This assembly was placed in a vacuum furnace and heated at 600° C./hour from room temperature to 975° C. and sintered at a dynamic vacuum of $10^{-6}$ torr for 1 hour, followed by cooling at 300° C./hour to room temperature. The resulting porous body (see FIG. 4) exhibited no apparent cracking adjacent to the interior circumference of the INCONEL support tube, and no macroscopic interior cracking. This desired result was attributed to a reduced densification shrinkage due to a shorter sintering process and the chamfered containment that helped establish a reduced gradient in radial tensile stress. The combination proved to be sufficient to avoid significant cracking (complete penetration), ensuring improved membrane deposition quality.

Example 3

Preparation and use of hydrogen separation device. Iron-aluminide microparticles with composition Fe-16Al-2Cr (weight percent) were prepared by a high-velocity gas jet atomization method (see Anderson et al., in "Progress Toward Gas Atomization Processing With Increased Uniformity and Control," Materials Science and Engineering A, vol. 326, (2002), pp. 101-109. The Fe-16Al-2Cr microparticles had a narrow size distribution with an average size of about 3 μm. Porous discs of INCONEL with nominal 0.1 μm pore size (MOTT METALLURGICAL) were press fit into the ends of ⅜" OD INCONEL tubes that had been drilled out to form a lip. The porous INCONEL frit was 0.31" thick and 0.245" in diameter. A 0.05" gap was left between the porous frit and the end of the tube. A slurry of the microparticles in isopropyl alcohol was prepared and applied over the INCONEL frit and the top smoothed off evenly with a razor blade. The membrane was fired in a vacuum furnace at a temperature of about 975° C. for about 4 hours.

Single gas hydrogen and argon permeation tests were performed using a flow-through system. The membrane was placed inside a 1.5" diameter stainless steel tube to collect the permeated hydrogen that was measured using a calibrated flow meter. A thermocouple in contact with the membrane tube was used to measure temperature. Overall system control and data logging was carried out using National Instruments Labview software and Fieldpoint modules.

After single gas permeability testing, a 1-μm thick film of palladium was deposited by electron beam physical vapor deposition (EB-PVD) inside a vacuum chamber at <$10^{-6}$ Pa. TABLE 1 shows a comparison of Hydrogen/Argon Ideal Gas Separation Factors for a Fe-16Al-2Cr Microparticle Membrane and the Same Membrane Coated with 1 μm of Pd.

TABLE 1

| Temperature (° C.) | Pressure (psia) | Ideal Gas Separation Factor ($\alpha_{H2/Ar}$) of Fe-16Al-2Cr Membrane | Ideal Gas Separation Factor ($\alpha_{H2/Ar}$) of Pd-coated Fe-16Al-2Cr Membrane |
|---|---|---|---|
| 30 | 28.1 | 2.81 | — |
| 150 | 29.8 | 3.03 | — |
| 300 | 44.3 | 2.85 | — |
| 350 | 14.7 | — | 3.30 |
| 350 | 45 | — | 3.03 |
| 400 | 29.5 | 2.7 | — |
| 500 | 44.0 | 2.86 | — |
| 600 | 45 | 3.06 | — |

From the data, the separation factor of the palladium-coated membrane was equivalent or greater than the values obtained for the bare porous Fe-16Al-2Cr membrane. This may indicate a contribution from activated diffusion through the palladium to the overall mechanism of hydrogen transport through the composite membrane.

In summary, porous membranes were fabricated from Fe-16Al-2Cr (wt. %) particles of 3-µm average diameter. A slurry of 3-µm particles was applied onto porous INCONEL supports. At temperatures up to 600° C., the membrane had high hydrogen and argon permeability, but the gas permselectivities were indicative of Knudsen diffusion. The porous Fe-16Al-2Cr membrane was covered with a layer of alumina that should serve as an effective barrier to metallic interdiffusion for the thin palladium film deposited onto the surface.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A device for separating hydrogen from other materials, comprising:
   a porous substrate of metal microparticles of an alloy of chromium, aluminum, and iron, the metal microparticles being coated with an outer atomic diffusion barrier layer comprising aluminum oxide that is substantially incapable of hydrogen reduction the porous substrate prepared by sintering said metal microparticles until said outer atomic diffusion barrier layer forms on the surface of the microparticles; and
   hydrogen separation material on the diffusion barrier layer of the support structure.

2. The device of claim 1, wherein said porous substrate of metal microparticles comprises microparticles of Fe-16Al-2Cr.

3. The device of claim 1, wherein said hydrogen separation material is comprised of palladium or alloys of palladium.

4. The device of claim 1, wherein the metal microparticles comprise spherical microparticles.

5. The device of claim 1, wherein said porous substrate comprises pore sizes in a range of from about 0.05 micrometers to about 0.5 micrometers.

6. The device of claim 1, wherein said porous substrate comprises pore sizes in a range of from about 0.1 micrometers to about 0.3 micrometers.

7. A method for making a device for separating hydrogen from a gaseous mixture, comprising:
   forming a porous support structure from microparticles of an alloy of chromium, aluminum, and iron, said porous support being formed by sintering the microparticles until an outer diffusion barrier layer comprising aluminum oxide that is substantially incapable of hydrogen reduction forms on the alloy microparticles; and
   depositing hydrogen separation material on the diffusion barrier layer of the support structure.

8. The method of claim 7, wherein the microparticles used for forming the support structure comprise spherical microparticles.

9. The method of claim 7, wherein the alloy is Fe-16Al-2Cr.

10. The method of claim 7, wherein the step of forming said support structure is performed by sintering the microparticles together so that a support structure having pore sizes in a range of from about 0.05 micrometers to about 0.15 micrometers is formed.

11. The method of claim 7, wherein the metal microparticles are applied onto a macroporous membrane prior to sintering.

12. The method of claim 9, wherein the sintering is at a temperature of approximately 975° C. for approximately 4 hours.

13. The method of claim 12, wherein the hydrogen separation material is comprised of palladium or alloys of palladium.

14. The method of claim 7, where the step of depositing the hydrogen separation material is by a technique selected from the group consisting of electroless plating, electroplating, chemical vapor deposition, physical vapor deposition, ion exchange, impregnation and reduction, and combinations thereof.

15. A method for separating hydrogen, comprising:
   forming a porous support structure by sintering metal microparticles of an alloy of chromium, aluminum, and iron wherein the sintering results in an outer diffusion barrier layer comprising aluminum oxide on the microparticles that is substantially incapable of hydrogen reduction;
   depositing hydrogen separating material on the diffusion barrier layer, thereby forming a device for separating hydrogen; and
   using the device to separate hydrogen.

16. The method of claim 15, wherein the hydrogen separating material is comprised of palladium or alloys of palladium.

17. The method of claim 15, wherein the porous support structure further comprises yttrium.

18. The method of claim 15, wherein the microparticles used for forming the support structure comprise spherical microparticles.

* * * * *